Patented Apr. 22, 1952

2,594,180

UNITED STATES PATENT OFFICE 2,594,180

VACCINE AND PROCESS FOR MANUFACTURING THE SAME

Arden H. Killinger and John R. Dick, Fort Dodge, Iowa, assignors to Fort Dodge Laboratories, Inc., Fort Dodge, Iowa, a corporation of Delaware No Drawing. Application April 26, 1949, Serial No. 89,796

9 Claims. (Cl. 167—80)

This invention relates to a vaccine for the prevention and treatment of hog cholera and a method for the preparation of the same.

In the control of hog cholera, the first successful method of immunization of hogs against hog cholera which was developed by Dorset and others, depended upon the use of live hog cholera virus derived from an animal sick with the disease, used simultaneously with an anti-serum against hog cholera virus. This method is dependent upon the use of varying amounts of serum and a more or less constant dose of virus. The variation in the dosage of serum depends upon the weight of the individual being immunized. Although the method confers immediate protection against hog cholera, active immunity is not strong for approximately two weeks. This, however, is not apparent because the passive immunity carries the individual over until active immunity can be established.

One outstanding disadvantage of this method is the fact that live virus is constantly seeded upon the premises, which is a potential source of hog cholera in susceptible animals. Furthermore, sometimes a false sense of security is had by the owner following vaccination in which virus of low potency has been used and the resulting immunity is merely a passive immunity which may be lost in as few as twenty-one days. Nevertheless, this method, from its beginning in the early 1900's, is widely recognized and widely used today.

Recognizing the deficiencies of the above-described method of immunization, further investigations resulted in new methods seeking to obtain vaccines by a so-called attenuation of the virus. The proposed procedures of Boynton, Tilley, and others involving the use of chemicals and heat generally result either in a type of attenuation where the virus is rendered incapable of growing when injected into a susceptible hog or actually destroys the hog cholera virus. Thus, instead of having a truly attenuated virus capable of reproducing to the point of insuring a life-long immunity, prior vaccines depended upon the immunization of hogs against hog cholera on the basis of the antigenic qualities of the killed virus. These vaccines do not give immediate protection but require at least seven days in which to stimulate an active immunity and the resulting immunity has been found to be somewhat transient—in other words, the immunity does not seem to last—and frequently hogs must be re-vaccinated after six months and at periodic intervals thereafter to insure immunity. This method cannot safely be used in conjunction with anti-hog cholera serum, nor has it been recommended for use within two weeks following the use of anti-hog cholera serum. It has also been found that swine so vaccinated are often hypersensitive to infection and may sicken from causes other than hog cholera during the immunization period.

The present invention successfully overcomes the deficiencies inherent in the prior methods briefly described since by the use of the procedure hereinafter described, a rabbit-attenuated, swine-propagated hog cholera virus product of concentrated strength is obtained which, in relatively small doses, is capable of conferring on swine a lasting immunity to hog cholera in contradistinction to the prior vaccines, and without the need of virulent hog cholera virus for full protection as heretofore required when relying upon the prior anti-hog cholera serum method of protection. By this invention, therefore, fully adequate protection to hog cholera is achieved and, in addition, the present-day danger of perpetuating hog cholera by seeding the virulent virus on the farm is completely avoided.

The attenuation of the virulent hog cholera virus is known to be capable of being brought about by serial passage through rabbits. Attenuation is brought about by injecting hog cholera virus intravenously into rabbits. The temperature of the rabbits is taken daily and, when a temperature rise is evident, the rabbits are sacrificed, their blood, or spleens or other viscera pooled, finely ground if solids are used, and a portion of this material is made into a saline suspension and injected intravenously into a second group of rabbits. These, in turn, are sacrificed when a temperature rise is evident and the same procedure as above outlined is repeated. Serial passage is thus carried out until the virus has become attenuated. Generally about 13 to 15 serial passages are required to secure the desired attenuation.

To determine when the attenuation has taken place, it is necessary to inject a portion of the macerated tissue suspension (if this is used) from each rabbit passage into hog cholera susceptible swine. When attenuation is reached, the swine may show a fever but this is the only sign of illness. This can now be termed a rabbit-attenuated hog cholera virus. Apparently, the virulent hog cholera virus is modified by passing serially through rabbits from a disease-producing virus to one incapable of causing disease. The virus is viable, however, and still retains an antigenicity factor and, when injected into a susceptible hog, generally stimulates it to produce an active immunity against hog cholera.

It has been found, however, that defibrinated rabbit blood or tissue suspension containing rabbit-attenuated hog cholera virus is lacking in important characteristics. For the general immunization of swine, this material has definite disadvantages. Firstly, rabbit blood or tissues when injected into swine may produce shock because of incompatibility. Secondly, the concentration of the attenuated virus in the blood and tissues of the rabbit has been found to be undesirably low and therefore relatively large amounts are required to obtain satisfactory immunization. As a final factor leading away from the utilization of rabbit tissue or blood for immunization, the yield of immunizing material is low and therefore a considerable number of animals are required. These disadvantages obviously result in great expense in order to obtain sufficient vaccine of acceptable concentration for mass immunization of hogs.

The disadvantages were overcome when it was discovered that swine, which were inoculated with rabbit-attenuated virus, built up a surprisingly high concentration of attenuated virus in their blood and tissues such as spleen, liver, kidney, testes, etc. Moreover, it was also found that these materials with proper treatment could be used as a highly effective attenuated-virus vaccine since the virus did not increase in virulence when injected into swine. Thus, instead of the low concentration, low-yield rabbit product, a highly concentrated swine-propagated vaccine is obtained in much greater yields. In addition, this product is obviously less liable to produce shock because of greater compatibility.

In accordance with the invention, rabbit-attenuated hog cholera virus contained in tissue, spleen or other viscera in suspension or defibrinated rabbit blood is injected into a hog. Upon the parenteral injection of the rabbit-attenuated virus into swine, a rise in temperature is generally noted within three to five days. This temperature rise persists from three to five days after its onset and then disappears. The swine do not go off feed.

If an animal showing this febrile reaction is sacrificed on the second or third day from the onset of fever, the blood and/or any tissue or viscera will harbor the attenuated virus and thus will constitute the source for obtaining the desired product which, when injected parenterally into susceptible swine, will stimulate those swine to become actively immune to hog cholera. This product is not only more compatible to swine than rabbit tissue but, more important, it contains a greater concentration of attenuated virus, requiring the use of relatively small amounts for achieving the desired effect. Furthermore, by carrying out the propagation of attenuated virus in swine, the yield of virus is greater because of the comparative differences in size between rabbits and swine.

As a specific illustration of the method for obtaining the product of the invention, virulent hog cholera virus is rendered bacteriologically sterile and is injected intravenously into rabbits. Temperatures are taken twice daily and, when a temperature rise is noted, the rabbits are sacrificed, their spleens pooled, macerated, and suspended in diluent such as physiological saline. A portion of this suspension is then injected in a second group of rabbits. These are sacrificed when a temperature rise is evident and the same procedure as above outlined is repeated. Generally, on about the thirteenth rabbit passage, attenuation is achieved. The rabbit-attenuated hog cholera virus is now ready for propagation in swine. Rabbit tissue is finely ground, suspended in physiologic salt or other diluent and is injected parenterally into cholera-susceptible swine. The dosage may vary in limits from about ¼cc. of a 1% spleen suspension to about 10 cc. of a 10% spleen suspension in diluent, by weight, based on the entire composition. Within three to five days a temperature rise is observed, generally from about 102°–105° F., this rise persisting from about three to five days. On the second or third day from the onset of fever, the animal is sacrificed and the blood, tissues and viscera in general containing the attenuated virus are separated for processing.

It may be pointed out that it is possible to obtain the desired product without sacrifice of the animal. For examplé, the hog may be bled at intervals and the blood thus obtained may be used to prepare the product. As a further method, the spleen may be removed surgically under aseptic conditions, thus saving the hog. Still further, one may use male hogs, these being injected with rabbit-attenuated virus directly into the testicle. On the second or third day after the onset of fever, the testicles are surgically removed under aseptic conditions for processing. Thus, this method also provides a good source of rabbit-attenuated swine-propagated virus without sacrifiicing the animal.

To obtain the desired product, the blood, if this is used, is first defibrinated by known means and then rendered bacteriologically sterile by the addition or phenol or other similarly acting substance. If hog tissue is used, the tissue is finely ground and screened. The fine material may either be dried and later reconstituted or suspended in a diluent at the time of use if desired, or may immediately be added to a buffered isotonic solution or admixed with glycine, lactose or other suitable diluents. In addition, other active substances or excipients may be incorporated with the product, if desired. As an example, a suitable composition, using either attenuated virus in defibrinated hog blood or clear blood serum or finely ground hog tissues may be made up with crystal violet and glycerol in the proportions taught by Tilley in his Patent 2,369,267, dated February 13, 1945.

In order to obtain a sterile product free of contaminating organisms, an antibiotic, bacteriostatic or bactericidal agent is added in an effective amount to destroy or prevent the growth of bacterial organisms. Such antiseptics as phenol, a dye having bacteriostatic or bactericidal action, a sulphanilimide such as sulfamethazine, sulfamerazine, sulaquinoxaline, etc., or in fact any known antibiotic, bacteriostatic or bactericidal agent is useful for this purpose. Obviously such substances are used in such amounts as to be non-toxic in use and incapable of destroying the immunizing power of the attenuated virus. The use of such a material has been found to substantially increase the longevity of the attenuated virus in storage and to check secondary infections in use. While a dye such as crystal violet, for example, has been found especially effective, other dyes of like nature may be used, such as methylene blue, acriflavine, etc. In the presence of, and in admixture with, about ½% phenol, for example, defibrinated blood has been held at ordinary refrigerator temperature for at least one hundred days. Even longer times have been obtained when using about 10% or more of a bacteriostatic dye. In the absence of these added agents, the attenuated virus vaccine must be used within a short time after its preparation for effective results. Additionally, it is believed that the use of added agents is effective in preventing secondary infections to which the swine are at times susceptible following their immunization to hog cholera virus. Antibiotic, bacteriostatic or bactericidal agents and even gamma-globulin, either alone or in admixture, used in conjunction with the attenuated hog cholera virus for the combined purpose of immunizing against hog cholera and protecting against secondary infections, coact to fully maintain the health of the hog during the time that a solid immunity to hog cholera is being achieved.

Still another active agent which may be used in conjunction with the attenuated hog cholera virus is the well-known anti-hog cholera serum mentioned hereinabove. As already indicated, prior practice of immunizing hogs consists of injecting anti-hog cholera serum along with an injection of virulent hog cholera virus. If it is desired to use this serum, whether for achieving immediate temporary passive immunity to cholera or for preventing secondary infections, it has been found that excellent results may be attained without the use of virulent hog cholera virus by using the attenuated virus products of the invention together with the anti-hog cholera serum.

The following examples are further illustrative of the invention:

*Example I*

A sterile 10% suspension of hog spleen containing rabbit-attenuated, swine-propagated hog cholera virus was prepared by grinding the spleen in a tissue grinder with physiologic saline until a homogeneous suspension was prepared. From this 10% spleen suspension, serial tenfold dilutions were prepared in sterile physiologic saline by adding 1 cc. of the 10% suspension to 9 cc. of sterile physiologic saline, mixing and transferring until serial dilutions from 1–100 to 1–1,000,000 had been prepared.

Susceptible pigs were injected subcutaneously in the axilla with 1 cc. of the serial dilutions, 1–10,000, 1–100,000 and 1–1,000,000, four pigs per dilution. Rectal temperatures of the pigs were taken daily for twenty-one days.

During this period, four of four pigs injected with the 1–10,000 dilution, three of four pigs injected with the 1–100,000 dilution and two of four pigs injected with the 1–1,000,000 dilution showed elevated temperatures.

Twenty-one days after the injection of the hog spleen dilutions, the resistance of all pigs was challenged by the injection of 2 cc. of virulent hog cholera virus blood. One pig which had received the 1–1,000,000 dilution died after challenge. All other pigs survived without evidence of cholera.

On this basis it is concluded that the minimum immunizing dose of the rabbit-attenuated, swine-propagated hog cholera virus is in the range of 1 cc. of a 1–100,000 to 1–1,000,000 dilution.

*Example II*

Similar susceptible pigs were injected subcutaneously in the axilla with 1 cc. of the serial dilutions of hog spleen prepared as in Example I, 1–10,000, 1–100,000 and 1–1,000,000 four pigs per dilution. Simultaneously, each pig was injected subcutaneously in the axilla on the other side with 10 cc. of anti-hog cholera serum. Rectal temperatures of the pigs were taken daily for twenty-one days. During this period, only one pig in the 1–10,000 dilution showed any significant temperature rise.

In order to allow the passive immunity conferred by the serum to become dissipated, the resistance of these pigs was challenged with 2 cc. of virulent hog cholera virus blood six weeks after injection. Three pigs injected with the 1–1,000,000 dilution died after challenge. The balance survived without evidence of cholera.

On this basis, it is concluded that the minimum immunizing dose of rabbit-attenuated, swine-propagated hog cholera virus when given simultaneously with 10 cc. of anti-hog cholera serum is in the range of 1 cc. of a 1–100,000 to 1–1,000,000 dilution.

It should be noted that, while the above example indicates the more preferred method of separate injection of virus and serum, the anti-hog cholera serum may be admixed with the attenuated virus suspension for injection, if so desired. When both serum and attenuated virus are injected, the amount of each such should be selected so that the virus is not completely killed. It has been found that approximately 5–15 cc. of anti-hog cholera serum, when used together with approximately 1 cc. of attenuated virus prepared as described above, satisfactorily immunizes hogs against hog cholera and additionally protects them substantially against secondary infections.

Dosages of swine-propagated, rabbit-attenuated virus for immunizing hogs may vary widely. One-half cubic centimeter of attenuated virus blood is more than adequate, while 10 cc. of attenuated virus blood apparently does no better or worse than the smaller amount insofar as conferring immunity to hog cholera is concerned. With hog viscera such as hog spleen, the minimum immunizing dose is in the approximate range of 1 cc. of a 1:100,000 to 1:1,000,000 dilution. The product is administered either by parenteral injection or fed per orum. It is apparently only necessary to get a very small amount of the attenuated virus into a susceptible hog. There it reproduces itself and stimulates an active immunity, presumably, lifelong.

Having described our invention, what we claim is as follows:

1. In a process of preparing a vaccine for immunizing swine against hog cholera wherein a virulent strain of hog cholera virus is attenuated solely by about 13 to 15 serial rabbit transfers, the improvement comprising propagating hog cholera attenuated virus through swine and securing a hog product containing attenuated virus in concentrated form, by injection of the virus attenuated by rabbit transfers into a hog and, when a temperature rise above normal is obtained, harvesting hog substance containing the virus in relatively high concentration, said hog substance being selected from the group consisting of hog blood, hog spleen and hog testicle, treating said hog substance to remove undesired fractions of the group consisting of fibrin and unduly large particles incapable of passing through a fine screen, discarding said undesired hog fractions and finally isolating a hog cholera vaccine substance of hog origin containing attenuated hog cholera virus in relatively high concentration.

2. A process of preparing a vaccine for immunizing swine against hog cholera, comprising the steps of attenuating a virulent strain of hog cholera virus solely by about 13 to 15 serial rabbit transfers, isolating the rabbit substance containing attenuated hog cholera virus in relatively low concentration, concentrating said attenuated virus by injection of said rabbit substance into a hog and, when a temperature rise above normal is obtained, bleeding the hog, treating the hog blood containing the virus in relative high concentration to remove fibrin therefrom, bacteriologically sterilizing the defibrinated hog blood and obtaining therefrom a vaccine comprising defibrinated hog blood carrying attenuated hog cholera virus in a relatively high concentration.

3. A process of preparing a vaccine for immunizing swine against hog cholera, comprising the steps of attenuating a virulent strain of hog cholera virus solely by about 13 to 15 serial rabbit transfers, isolating the rabbit substance containing attenuated hog cholera virus in relatively low concentration, concentrating said attenuated virus by injection of said rabbit substance into a hog and, when a temperature rise above normal is obtained, harvesting the hog spleen containing the virus in relatively high concentration, finely grinding said hog spleen, screening the finely ground material to remove undesired large particles and thereby obtaining a hog spleen tissue containing hog cholera virus in attenuated form and at a relatively high concentration.

4. A process of preparing a vaccine for immunizing swine against hog cholera, comprising the steps of attenuating a virulent strain of hog cholera virus solely by about 13 to 15 serial rabbit transfers, isolating the rabbit substance containing attenunated hog cholera virus in relatively low concentration, concentrating said attenuated virus by injection of said rabbit substance into the testicles of a hog and, when a temperature rise above normal is obtained, surgically removing the testicles, comminuting the hog testicles to fine particle size, screening off undesired large particles of the hog tissue from the finely ground material and thereby obtaining hog testicle tissue as a vaccine substance containing attenuated hog cholera virus in a relatively high concentration.

5. A rabbit-attenuated, swine-propagated hog cholera virus vaccine produced according to the process of claim 1 and capable of being administered with a serum conferring immediate passive immunity, comprising hog substance containing attenuated hog cholera virus wherein 1 cc. of a greater dilution than 1:10,000 (hog substance: diluent) is capable of conferring immunity to hogs from hog cholera disease.

6. A hog cholera vaccine composition produced according to the process of claim 1, comprising hog substance containing a relatively concentrated amount of rabbit-attenuated, swine-propagated hog cholera virus capable of conferring long lasting immunity to hog cholera in swine and wherein to confer said immunity each cc. need not contain more than about 0.01%-0.0001% of said hog substance.

7. A hog cholera virus vaccine produced according to the process of claim 1, comprising hog substance containing attenuated but live hog cholera virus in a concentration measured by the standard that the vaccine is substantially capable of immunizing swine against hog cholera disease at a dilution, hog substance: diluting medium, of substantially greater than 1:10,000 but not more than about 1:1,000,000.

8. A hog cholera virus vaccine produced according to the process of claim 3, comprising hog blood containing attenuated but live hog cholera virus in a concentration measured by the standard that the vaccine is substantially capable of immunizing swine against hog cholera disease at a dilution, hog substance: diluting medium, of substantially greater than 1:10,000 but not more than about 1:1,000,000; said hog substance carrying said attenuated virus being commingled with an antiseptic substance in an amount effective to provide antiseptic action.

9. A hog cholera virus vaccine produced according to the process of claim 2, comprising hog tissue containing attenuated but live hog cholera virus in a concentration measured by the standard that the vaccine is substantially capable of immunizing swine against hog cholera disease at a dilution, hog substance: diluting medium, of substantially greater than 1:10,000 but not more than about 1:1,000,000; said tissue carrying said attenuated virus being commingled with a bacteriostatic agent in an amount to provide effective bacteriostatic action.

ARDEN H. KILLINGER.
JOHN R. DICK.

REFERENCES CITED

The following references are of record in the file of this patent:

UNITED STATES PATENTS

| Number | Name | Date |
|---|---|---|
| 1,246,059 | Couret | Nov. 13, 1917 |
| 1,595,377 | Boynton | Aug. 10, 1926 |
| 2,012,789 | Kraybill | Aug. 27, 1935 |
| 2,369,267 | Tilley | Feb. 13, 1945 |
| 2,518,978 | Cox | Aug. 15, 1950 |

OTHER REFERENCES

Koprowski on Hog Cholera Virus in Rabbits, pages 178–183.

Baker on Hog Cholera Virus in Rabbits, pages 183–187.

Both of above in Proc. Soc. Exptl. Biol. & Med., vol. 63, No. 1, October 1946. 167–80.

Healy: "Attenuation of Hog Cholera Virus," in J. Infect. Dis. 19, pages 569–571 (1916). 167–80.